(12) United States Patent
Kottmyer et al.

(10) Patent No.: US 8,410,643 B2
(45) Date of Patent: Apr. 2, 2013

(54) FRAMELESS ELECTRIC MOTOR ASSEMBLY

(75) Inventors: Daniel L. Kottmyer, Springfield, OH (US); Robert J. Marks, Huber Heights, OH (US)

(73) Assignee: Globe Motors, Inc., Dayton, OH (US)

( * ) Notice: Subject to any disclaimer, the term of this patent is extended or adjusted under 35 U.S.C. 154(b) by 153 days.

(21) Appl. No.: 12/841,601

(22) Filed: Jul. 22, 2010

(65) Prior Publication Data
US 2012/0019080 A1    Jan. 26, 2012

(51) Int. Cl.
*H02K 1/04*    (2006.01)
*H02K 5/00*    (2006.01)

(52) U.S. Cl. ............... 310/43; 310/89; 310/90; 310/91; 310/216.114; 310/400

(58) Field of Classification Search ........... 310/43, 310/89, 90, 91, 211.114, 400, 216.114; H02K 1/04, H02K 5/00
See application file for complete search history.

(56) References Cited

U.S. PATENT DOCUMENTS

| | | | |
|---|---|---|---|
| 2,922,902 A * | 1/1960 | Hargreaves | 310/43 |
| 3,046,604 A | 7/1962 | Graham et al. | |
| 3,258,624 A * | 6/1966 | Turk | 310/216.116 |
| 3,671,790 A * | 6/1972 | Widstrand | 310/400 |
| 3,714,705 A * | 2/1973 | Lewis | 29/596 |
| 3,758,799 A * | 9/1973 | Dochterman et al. | 310/89 |
| 3,792,299 A | 2/1974 | Hallerback | |
| 3,979,822 A * | 9/1976 | Halm | 29/596 |
| 4,015,154 A | 3/1977 | Tanaka et al. | |
| 4,048,530 A * | 9/1977 | Kaufman, Jr. | 310/89 |
| 4,128,527 A | 12/1978 | Kinjo et al. | |
| 4,384,226 A * | 5/1983 | Sato et al. | 310/89 |
| 4,922,604 A | 5/1990 | Marshall et al. | |
| 5,008,572 A | 4/1991 | Marshall et al. | |
| 5,073,735 A | 12/1991 | Takagi | |
| 5,166,565 A * | 11/1992 | Katsuzawa et al. | 310/90 |
| 5,191,698 A * | 3/1993 | Sumi et al. | 29/596 |
| 5,490,319 A | 2/1996 | Nakamura et al. | |
| 5,672,927 A | 9/1997 | Viskochil | |
| 5,806,169 A | 9/1998 | Trago et al. | |
| 5,945,759 A * | 8/1999 | Tanaka et al. | 310/90 |
| 6,020,661 A * | 2/2000 | Trago et al. | 310/43 |
| 6,040,647 A * | 3/2000 | Brown et al. | 310/89 |
| 6,844,636 B2 | 1/2005 | Lieu et al. | |
| 2005/0093379 A1 * | 5/2005 | Tanabe et al. | 310/43 |
| 2008/0042499 A1 * | 2/2008 | Okada | 310/43 |
| 2012/0019080 A1 * | 1/2012 | Kottmyer et al. | 310/43 |

OTHER PUBLICATIONS

Matsushita Seiko Co Ltd; Publication No. 56-094952; Publication Date Jul. 31, 1981; Patent Abstracts of Japan.
Mitsubishi Electric Corp; Publication No. 59-106864; Publication Date Jun. 20, 1984; Patent Abstracts of Japan.

* cited by examiner

*Primary Examiner* — John K Kim
(74) *Attorney, Agent, or Firm* — Stevens & Showalter LLP

(57) ABSTRACT

An electric motor assembly including a stator assembly and a rotor assembly extending through the stator assembly. A first end cap is located adjacent to a first end of the stator assembly and includes a bearing insert supporting a first end bearing for receiving an end of a rotor shaft. A second end cap is located adjacent to a second end of the stator assembly. An endbell is formed separately from the second end cap and is positioned within the second end cap. The endbell supports a bearing for a second end of the rotor shaft. An overmold material extends through the stator assembly. The overmold material may form the first end cap, supporting the bearing insert therein, and extends within and substantially fills an annular space within the second end cap.

28 Claims, 9 Drawing Sheets

FRAMELESS ELECTRIC MOTOR ASSEMBLY

FIELD OF THE INVENTION

The present invention relates to electric motors and, more particularly, to electric motors including a rotor assembly located within a stator structure having a plurality of poles supporting field windings.

BACKGROUND OF THE INVENTION

In many conventional dynamoelectric machines, for example interior rotor brushless DC motors, the magnetic stator core comprises a stacked plurality of relatively thin laminations of magnetic material having a central bore which receives the rotor member of the machine. A plurality of slots extend radially inwardly within the stator core for receiving the field windings of the machine, wherein such slots are defined by radially extending poles. A predetermined number of turns of insulated wire conductor are arranged within such slots to form the excitation windings of the motor.

In a known construction of a motor, preformed end caps may be provided to either end of the stator core. The end caps may define side portions that extend along and enclose an outer side of the stator core. In an alternative construction for a motor assembly, such as is described in U.S. Pat. No. 6,020,661, at least one of the end caps may comprise an injection molded material.

SUMMARY OF THE INVENTION

In accordance with an aspect of the invention, an electric motor assembly is provided. The motor assembly includes a stator assembly comprising a stator stack including a plurality of radially extending stator poles extending between first and second ends of the stator stack and defining a central rotor passage through the electric motor assembly. The stator assembly additionally includes a plurality of windings extending through stator slots defined between the stator poles. The motor assembly further includes a rotor assembly comprising a rotor shaft having opposing first and second ends, and a central portion supported on the rotor shaft and extending through the central rotor passage. A first end cap is located adjacent to the first end of the stator stack and supports a first end bearing for receiving the first end of the rotor shaft. A second end cap is located adjacent to the second end of the stator stack and defines a second end cap bore concentrically aligned with the central rotor passage in an axial direction. An endbell is formed separately from the second end cap and is positioned within the second end cap bore. The endbell supports a bearing for receiving the second end of the rotor shaft.

In accordance with another aspect of the invention, an assembly for an electric motor is provided. The assembly for the electric motor comprises a stator stack including a plurality of radially extending stator poles extending between first and second ends of the stator stack and defining a central rotor passage through the assembly. A plurality of windings extend through stator slots defined between the stator poles. A first end cap is located adjacent to the first end of the stator stack, and a second end cap is located adjacent to the second end of the stator stack and defines a second end cap bore concentrically aligned with the central rotor passage in an axial direction. An overmold material extends through the stator stack and extends within and substantially fills an annular space within the second end cap. An endbell is formed separately from the second end cap and is positioned within the second end cap bore. The endbell comprises an aperture smaller than the second end cap bore for passage of a rotor shaft.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
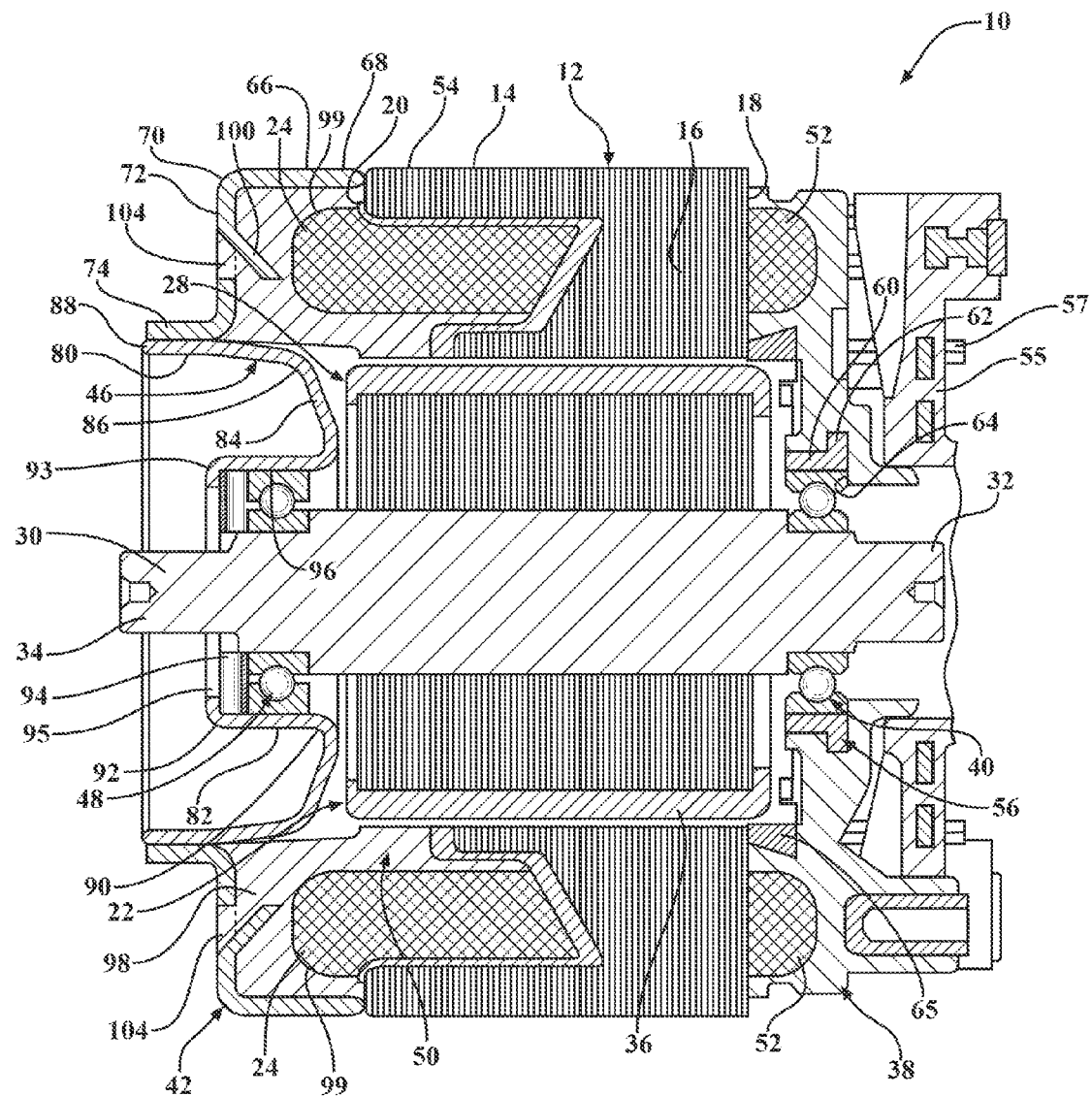
FIG. 1 is a cross-sectional view of a motor assembly illustrating aspects of the present invention.

Referring to FIG. 1, an electric motor assembly 10 illustrating the present invention is shown. The motor assembly 10 in the described embodiment may comprise, for example, a brushless DC motor. The motor assembly 10 includes a stator assembly 12 comprising a stator stack 14 including a plurality of radially extending stator poles 16 (see also FIGS. 7 and 8) extending between a first end 18 and a second end 20 of the stator stack 14. The stator poles 16 define a central rotor passage 22 (FIG. 7) through the electric motor assembly 10. The stator assembly 12 additionally includes a plurality of wire coils or field windings 24 extending through stator slots 26 (FIGS. 7 and 8) defined between the stator poles 16. The stator poles 16 and stator slots 26 illustrated in the present embodiment are depicted as having a skewed configuration. However, it should be understood that the present invention is not limited to this particular construction for the stator poles 16.

The motor assembly 10 further includes a rotor assembly 28 (FIG. 2) comprising a rotor shaft 30 having a first end 32 and an opposing second end 34, and a central rotor portion 36 supported on the rotor shaft 30 between the first and second ends 32, 34. The central rotor passage 22 defines a diameter that is at least slightly greater than the diameter of the central rotor portion 36, such that the central rotor portion 36 may be positioned extending through the central rotor passage 22.

A first end cap 38 is located adjacent to the first end 18 of the stator stack 14 and supports a first end bearing 40 for receiving the first end 32 of the rotor shaft 30. A second end cap 42 is located adjacent to the second end 20 of the stator stack 14 and defines a second end cap bore 44 concentrically aligned with the central rotor passage 22 in an axial direction. An endbell 46 is formed separately from the second end cap 42 and is positioned within the second end cap bore 44. The endbell 46 supports a second end bearing 48 for receiving the second end 34 of the rotor shaft 30. The first and second end bearings 40, 48 may be press fit onto the respective first and second ends 32, 34 of the rotor shaft 30.

Figure 2:
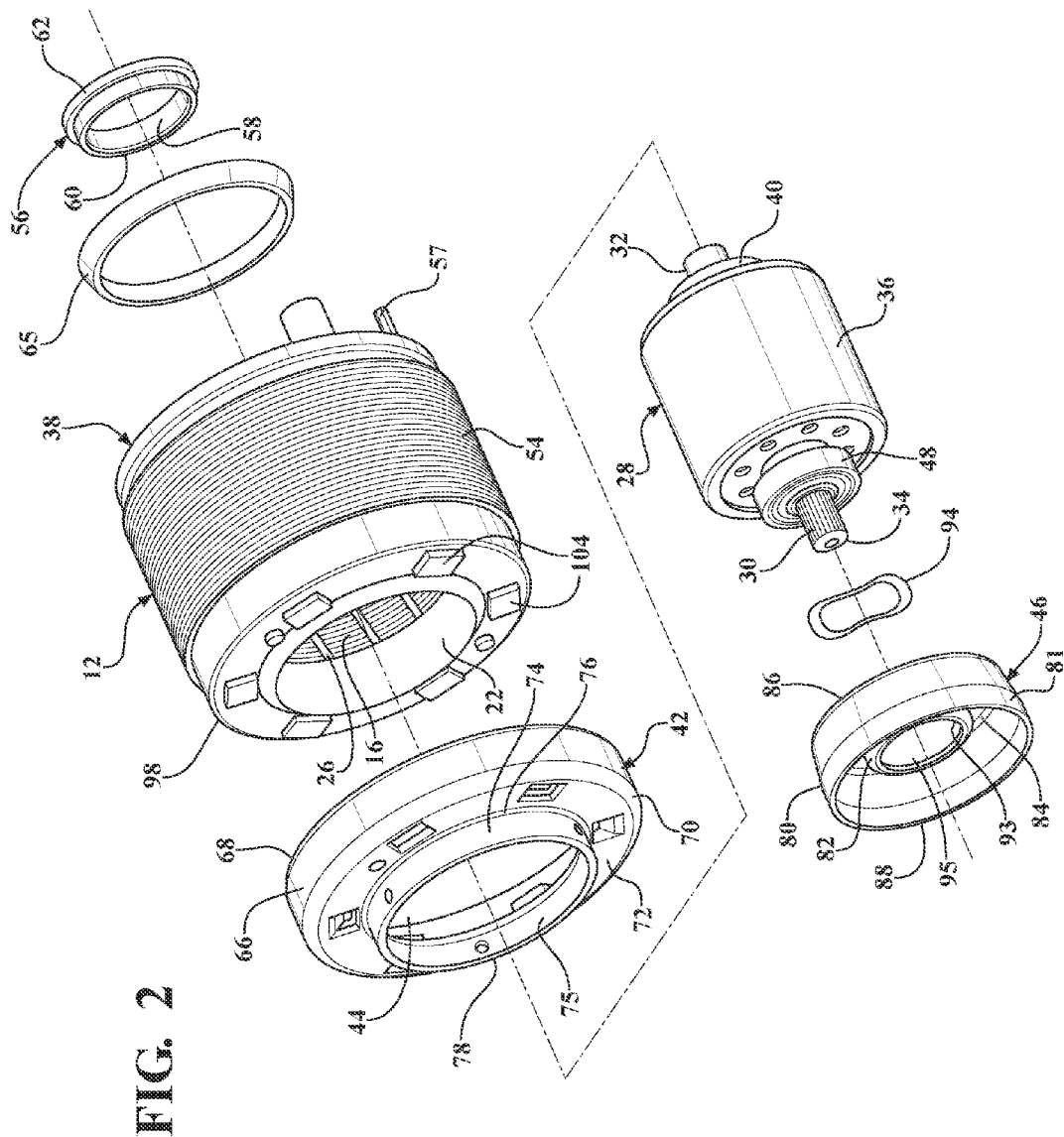
FIG. 2 is an exploded perspective view of the motor assembly of FIG. 1.

Referring to FIGS. 1 and 2, an overmold material 50 extends through the slots 26 of the stator stack 14, surrounding the windings 24 and substantially filling remaining spaces within the slots 26. The overmold material 50 may be a curable, injection molded, glass reinforced resin material. The overmold material 50 extends past the ends 18, 20 of the stator stack 14 and forms the first end cap 38 as a molded member having an outer diameter that extends radially outwardly past locations of first end turns 52 of the windings 24 at the first end 18 of the stator stack 14. Further, the outer diameter of the first end cap 38 is preferably less than or equal to an outer diameter of the stator stack 14, as defined by an outer surface 54 of the stator stack 14, such that the first end cap 38 does not increase the outer diameter dimension of the stator assembly 12. A termination device 55 may be supported on an axially outer side of the first end cap 38 for providing electrical power connections to end leads 57 extending through the overmold material 50 from the windings 24.

Referring to FIG. 1, as noted above, the first end bearing 40 is supported by the first end cap 38. In accordance with an aspect of the invention, a cylindrical bearing insert 56 may be molded into the first end cap 38, concentrically aligned with the central rotor passage 22, to directly engage and radially locate the first end bearing 40. The bearing insert 56 may be formed of a material that is unaffected by the conditions of the overmold process such as, for example, a metal material. An inner surface 58 defining an interior diameter of the bearing insert 56 is sized to receive the first end bearing 40 in a slip fit. The bearing insert 56 may be formed with a main body portion 60 defining the inner surface 58 and a radially outwardly extending rim portion 62 (see also FIG. 2) for facilitating retention of the bearing insert 56 in the overmold material 50. It may be noted that the bearing insert 56 may be formed without the rim portion 62, where the overmold material 50 is permitted to flow over at least a portion of the bearing insert 56 facing toward the second end 20 of the stator stack 14 in order to retain the bearing insert 56 in position.

Further, a shoulder portion 64 is preferably formed in the overmold material 50 of the first end cap 38. The shoulder portion 64 extends radially inwardly from a radius defined by the inner surface 58 of the bearing insert 62. The shoulder portion 64 forms a reference surface for engaging an axial end of the first end bearing 40 to define an axial position for the first end bearing 40. It may be noted that in an alternative embodiment, the shoulder portion 64 may be replaced with a shoulder portion formed integrally with the bearing insert 56 to define a reference surface for the first end bearing 40.

As seen in FIG. 1, the first end cap 38 additionally includes a shutoff ring 65 positioned against the first end 18 of the stator stack 14 adjacent to inner ends of the stator poles 16. The shutoff ring 65 may be formed of a resin or plastic material, and is preferably formed of the same resin or plastic material as the overmold material 50, and provides a shutoff function during a molding operation forming the overmold material 50 to prevent the overmold material from extending within the central rotor passage 22, as is described further below.

As seen in FIGS. 1 and 2, in accordance with an aspect of the invention, the second end cap 42 may be an annular member of generally uniform thickness and, in particular, may comprise a stamped annular metal member. For example, the second end cap 42 may comprise a stamped steel component. The second end cap 42 includes a first axially extending end cap leg 66 having a first end 68 located adjacent to the second end 20 of the stator stack 14 and having a second end 70 located distal from the stator stack 14. A cap end portion 72 extends radially inwardly from the distal second end 70 of the first axially extending end cap leg 66. A second axially extending end cap leg 74 extends axially from the cap end portion 72 away from the stator stack 14. The second axially extending end cap leg 74 includes a first end 76 connected to a radially inner edge of the cap end portion 72, and a second end 78 located distal from the cap end portion 72. The first axially extending cap leg 66 is concentric with the outer diameter of the stator stack 14. An interior surface of the second axially extending leg 74 defines the second end cap bore 44.

In accordance with an aspect of the illustrated embodiment, at least the interior diameter of the first axially extending end cap leg 66 cooperates with the second end 20 of the stator stack 14 to facilitate an aspect of the overmold operation. That is, the interior diameter of the first end 68 of the first axially extending end cap leg 66 may be less than the outer diameter of the stator stack 14 to retain overmold material 50 in the area defined between the second end cap 42 and the second end 20 of the stator stack 14, as is described further below. In addition, contact between the first end 68 of the first axially extending end cap leg 66 and the stator stack 14 may provide a structure for transmitting axial forces between the second end cap 42 and the stator stack 14.

It should be noted that alternative configurations for retaining the mold material 50 in the area between the first axially extending end cap leg 66 and the second end 20 of the stator stack 14 may be provided. For example, in the event it is desirable to form the interior diameter of the first axially extending end cap leg 66 greater than the exterior diameter of the stator stack 14, and where it is not necessary to transmit axial forces between the second end cap 42 and the stator stack 14, other means may be provided for retaining the overmold material 50 inside the second end cap 42 during an overmold operation. Such means for retaining the overmold material 50 may comprise a member (not shown) that is either temporarily or permanently positioned at a gap between the first end 68 of the first axially extending end cap leg 66 and the outer diameter of the stator stack 14. For example, a means for shutting off and retaining the overmold material 50 may comprise a structure on a mold tool used during the overmold operation.

Referring to FIGS. 1 and 2, in accordance with an aspect of the invention, the endbell 46 may be an annular member of generally uniform thickness and, in particular, may comprise a stamped annular metal member. For example, the endbell 46 may comprise a stamped steel component. The endbell 46 includes a first axially extending leg 80, a second axially extending leg 82 radially spaced from the first leg 80 to define an annular gap therebetween, and a first flange portion 84 extending radially between the first and second legs 80, 82. The first leg 80 includes a first end 86 proximate to the stator stack 14 connected to an edge of the first flange portion 84, and second end 88 distal from the stator stack 14. The second leg 82 includes a first end 90 proximate to the stator stack 14 connected to an edge of the first flange portion 84, and a second end 92 distal from the stator stack 14.

The endbell 46 further includes a second flange portion 93 extending radially inwardly from the second end 92 of the second leg 82. The second flange portion 93 defines an aperture 95 smaller than the second end cap bore 44 for passage of the second end 34 of the rotor shaft 30 therethrough. The second flange portion 93 forms a support surface for supporting a resilient member, such as a wave spring 94, located between the second flange portion 93 and an axial end of the second end bearing 48. An outer surface of the second end bearing 48 is supported in engagement with an inner surface 96 of the second leg 82, between the first and second ends 90, 92 of the second leg 82. The endbell 46 may be slidably positioned in a press fit within the second end cap bore 44. Hence, the position of the endbell 46 relative to the second end cap 42, in the axial direction, may be adjusted to permit axial adjustment of the second flange portion 93 of the end bell 46 relative to the first end bearing 40 during installation of the rotor assembly 28, for compensating for manufacturing stack up tolerance variations, and to permit a predetermined preload to be applied through an axial biasing force applied by the wave spring 94 against the second end bearing 48. That is, a preload spring force may be determined by an axial height between the second end bearing 48 and the second flange portion 93 of the end bell 46.

As seen in FIG. 1, a second end portion 98 of the overmold material 50 extends radially outwardly past locations of second end turns 99 of the windings 24 at the second end 20 of the stator stack 14. The second portion 98 extends within and substantially fills an annular space within the second end cap 42 that is generally defined by an area surrounded by the first axially extending end cap leg 66 and the end cap portion 72. FIG. 2 further illustrates the second portion 98 of the overmold material 50 with the second end cap 42 shown separated from the overmold material 50, although it should be understood that in the actual construction of the motor assembly 10 the second end cap 42 remains in place around the second end portion 98 following an injection molding operation for molding the overmold material 50, as will be described further below.

In accordance with an aspect of the invention, the second end cap 42 includes a retention structure, illustrated in FIG. 1 as comprising a plurality of tabs 100, such as may be formed in a stamping operation to form the tabs 100 integrally from portions of the cap end portion 72. The tabs 100 extend axially inwardly into and are embedded within the second end portion 98 of the overmold material 50 to retain the second end cap 42 in a predetermined position on the second end 20 of the stator stack 14. In particular, the second end cap 42 is preferably held in position with the first end 68 of the first axially extending leg 66 located on an edge defined at the second end 20 of the stator stack 14. Further, openings 102 may be defined through the cap end portion 72 at locations where the tabs 100 are formed. The openings 102 may receive a tab opening portion 104 of the overmold material 50 therethrough for further effecting retention of the second end cap 42 to the stator assembly 12.

Figure 3:
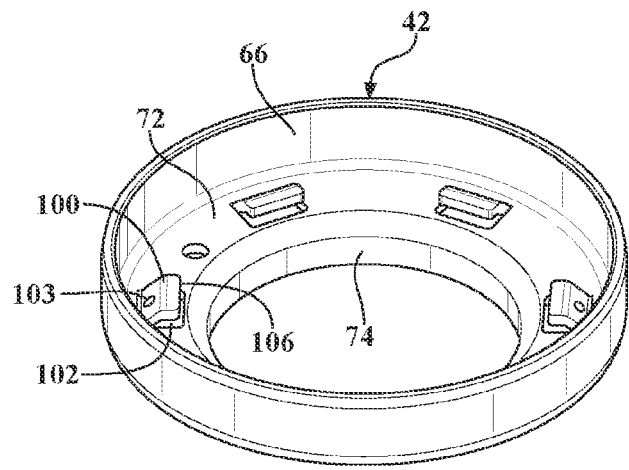
FIG. 3 is a perspective view of a second end cap for the motor assembly illustrating a first tab configuration.
Figure 3A:
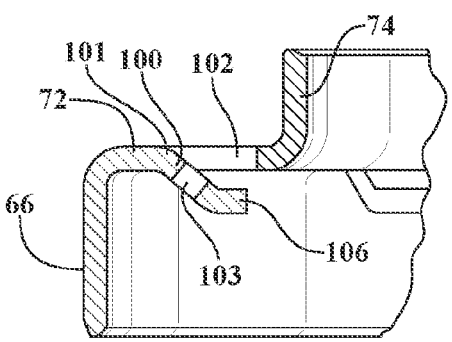
FIG. 3A is a cross-sectional view of a portion of the second end cap of FIG. 3.

Referring to FIGS. 3 and 3A, the second end cap 42 is illustrated and includes tabs 100 bent such that the tabs 100 are angled axially inwardly from an attachment 101 to the cap end portion 72 that is radially closer to the first axially extending leg 66 than to the second axially extending leg 74. Openings 103 are formed in the tabs 100 for receiving the overmold material 50 therethrough which may facilitate retention of the tabs 100 in the second end portion 98 of the overmold material 50. In addition, an end portion 106 of the tabs 100 may define a second bend to extend generally parallel to the cap end portion 72 which may further facilitate retention of the tabs 100 within the overmold material 50.

Figure 4:
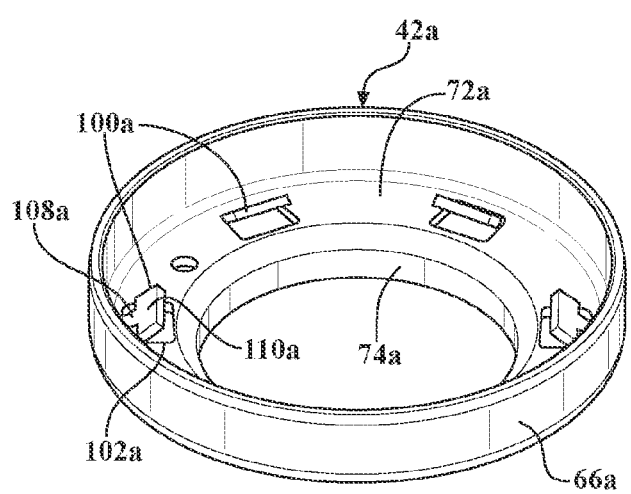
FIG. 4 is a perspective view of a second end cap for the motor assembly illustrating a second tab configuration.
Figure 4A:
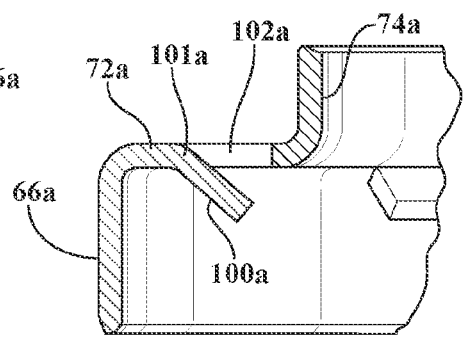
FIG. 4A is a cross-sectional view of a portion of the second end cap of FIG. 4.

Referring to FIGS. 4 and 4A, an alternative configuration of the second end cap 42 is illustrated where elements corresponding to elements of the second end cap 42 are labeled with the same reference numeral having a suffix "a" added thereto. The second end cap 42a includes tabs 100a bent such that the tabs 100a are angled axially inwardly from an attachment 101a to the cap end portion 72a that is radially closer to the first axially extending leg 66a than to the second axially extending leg 74a. The tabs 100a are configured as T-shaped elements including a narrow attachment portion 108a and an enlarged end portion 110a wherein the enlarged end portion 110a may facilitate retention of the tabs 100a in the overmold material 50.

Figure 5:
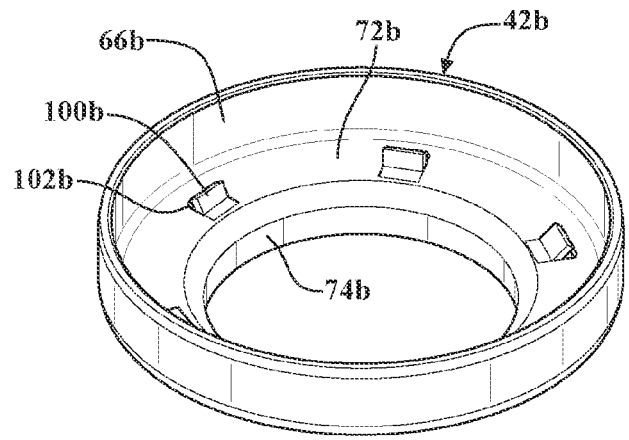
FIG. 5 is a perspective view of a second end cap for the motor assembly illustrating a third tab configuration.
Figure 5A:
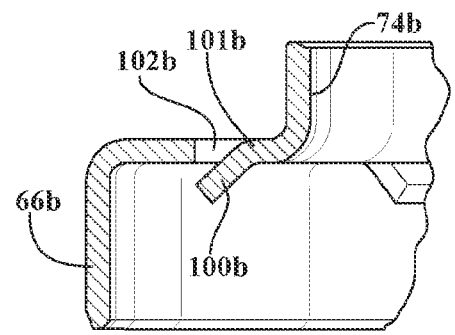
FIG. 5A is a cross-sectional view of a portion of the second end cap of FIG. 5.

Referring to FIGS. 5 and 5A, an alternative configuration of the second end cap 42 is illustrated where elements corresponding to elements of the second end cap 42 are labeled with the same reference numeral having a suffix "b" added thereto. The second end cap 42b includes tabs 100b bent such that the tabs 100b are angled axially inwardly from an attachment 101b to the cap end portion 72b that is radially closer to the second axially extending leg 74b than to the first axially extending leg 66b. The tabs 100b may be formed without any additional retention features, such as additional bends or holes, for engaging the overmold material 50.

Figure 6:
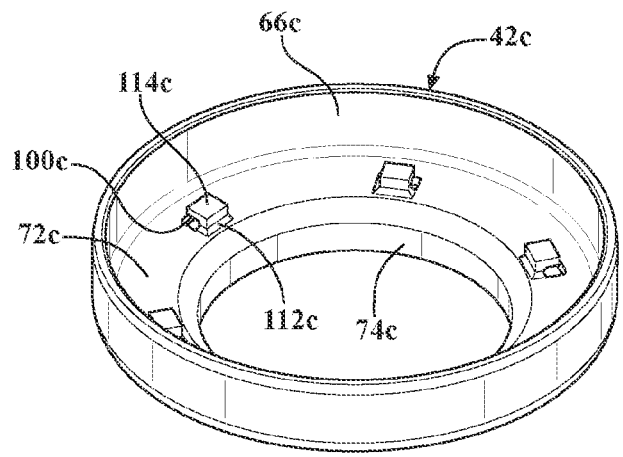
FIG. 6 is a perspective view of a second end cap for the motor assembly illustrating a fourth tab configuration.
Figure 6A:
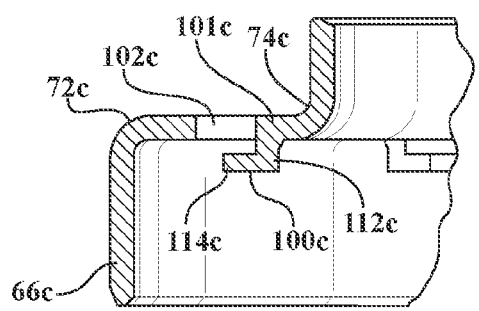
FIG. 6A is a cross-sectional view of a portion of the second end cap of FIG. 6.

Referring to FIGS. 6 and 6A, an alternative configuration of the second end cap 42 is illustrated where elements corresponding to elements of the second end cap 42 are labeled with the same reference numeral having a suffix "c" added thereto. The second end cap 42c may comprise a machined component including tabs 100c machined such that the tabs 100c extend axially inwardly from an attachment 101c to the cap end portion 72c that is radially closer to the second axially extending leg 74c than to the second first axially extending leg 66c. The tabs 100c are machined as L-shaped elements including a substantially axially extending portion 112c and a substantially radially extending portion 114c wherein the L-shaped configuration may facilitate retention of the tabs 100c in the overmold material 50.

Figure 7:
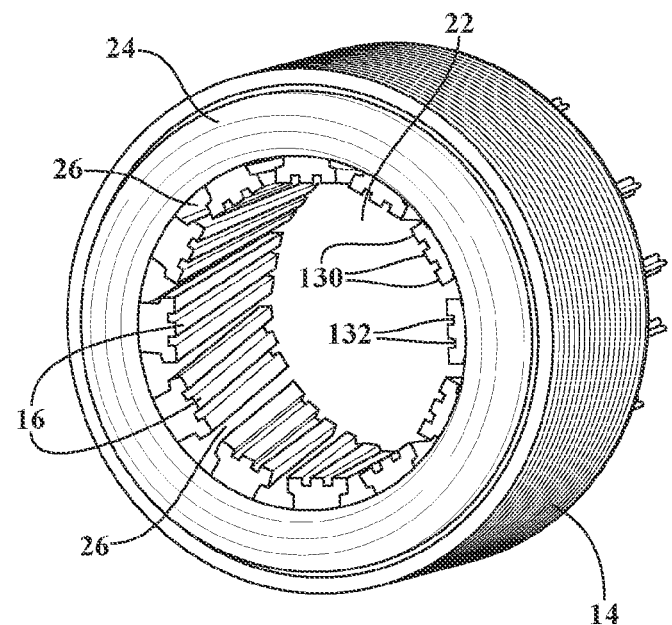
FIG. 7 is a perspective view of a wound stator stack.
Figure 8:
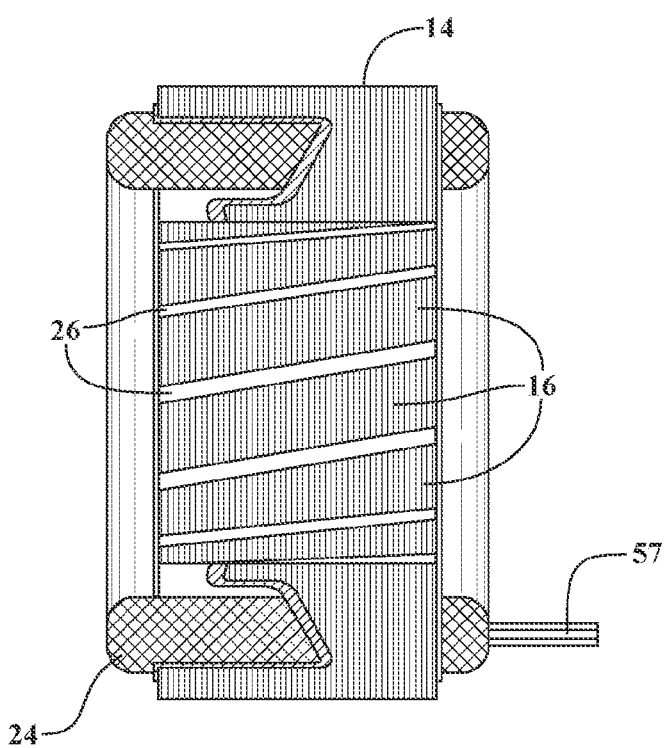
FIG. 8 is a cross-sectional view of the wound stator stack of FIG. 7.

Referring to FIGS. 7-11, a process for providing the overmold material 50 to the stator assembly 12 will be described. FIG. 7 illustrates a stator stack 14 provided with field windings 24 prior to the process of providing the overmold material 50, and FIG. 8 illustrates a cross-sectional view of the wound stator stack 14 of FIG. 7.

Figure 9:
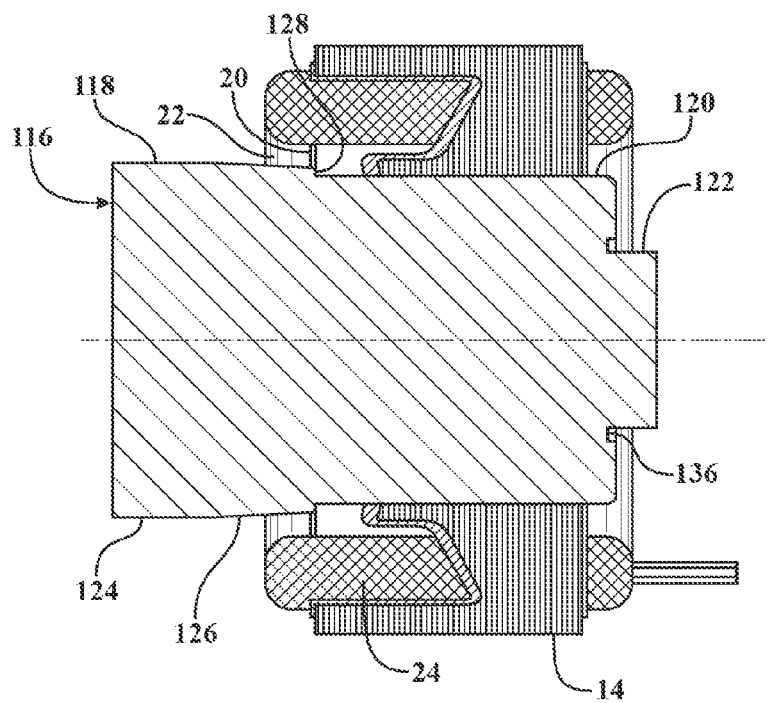
FIGS. 9-11 are cross-sectional views illustrating steps of forming a stator assembly with overmold material.

Referring to FIG. 9, a mold tool horn 116 is initially inserted into the central rotor passage 22 from the second end 20 of the stator stack 14. The mold tool horn 116 includes an end cap bore portion 118, a central bore portion 120 and an end bearing portion 122. The end cap bore portion 118 comprises a first diameter portion 124 and a tapered bore portion 126. The central bore portion 120 is configured with a diameter that matches the inner diameter of the central rotor passage 22, as defined by axially extending inner edges of fluted portions 130 (FIG. 7) of the stator poles 16. The fluted portions 130 are separated by grooves 132, and the fluted portions 130 and grooves 132 form bifurcated inner edges of the stator poles 16.

A step 128 is defined between the tapered bore portion 126 and the central bore portion 120 of the mold tool horn 116. The step 128 is configured to rest against the second end 20 of the stator stack 14, defining an axial position for the mold tool horn 116 and closing off grooves 132 defined between adjacent fluted portions 130 at the second end 20 of the stator stack 14.

Figure 10:
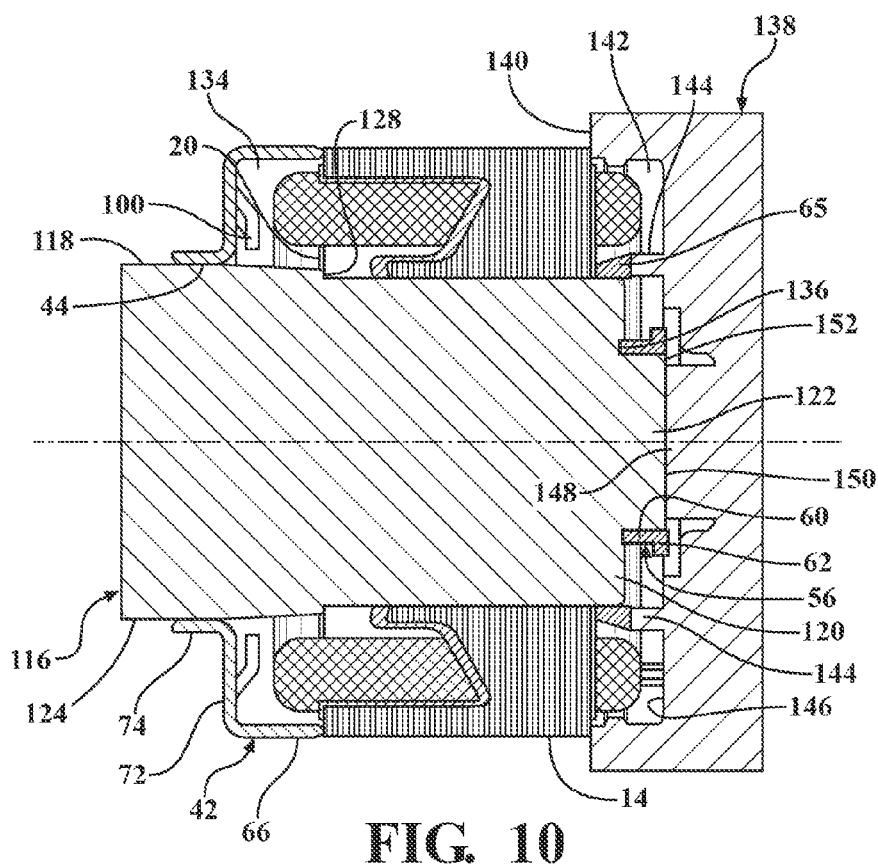
Figure 11:
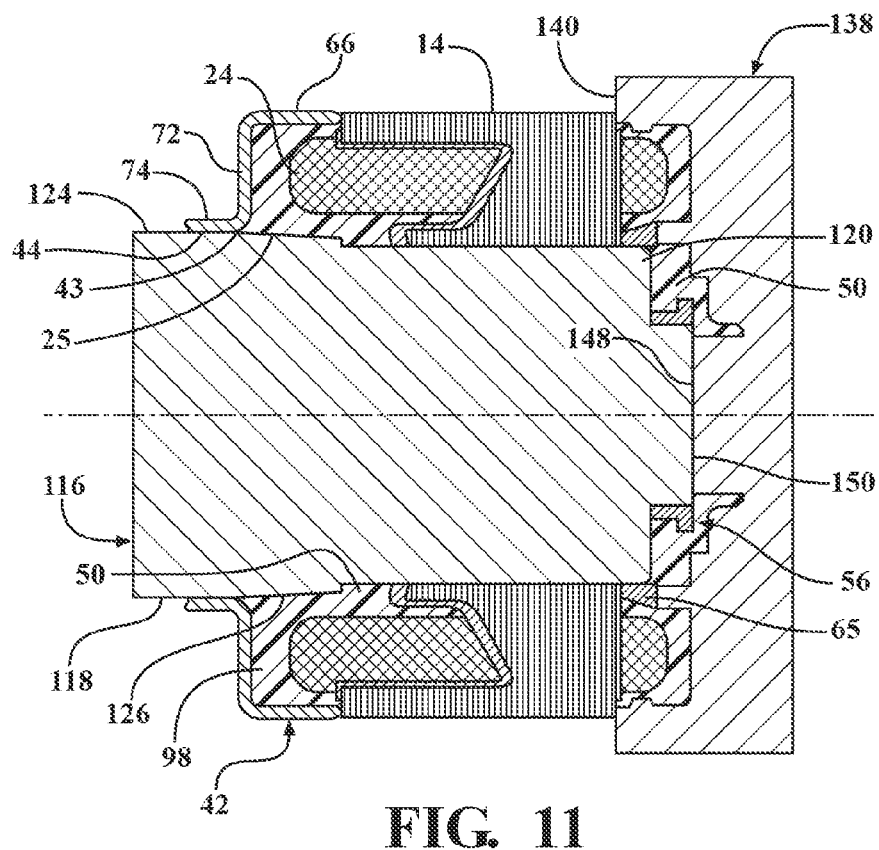
Figure 12:
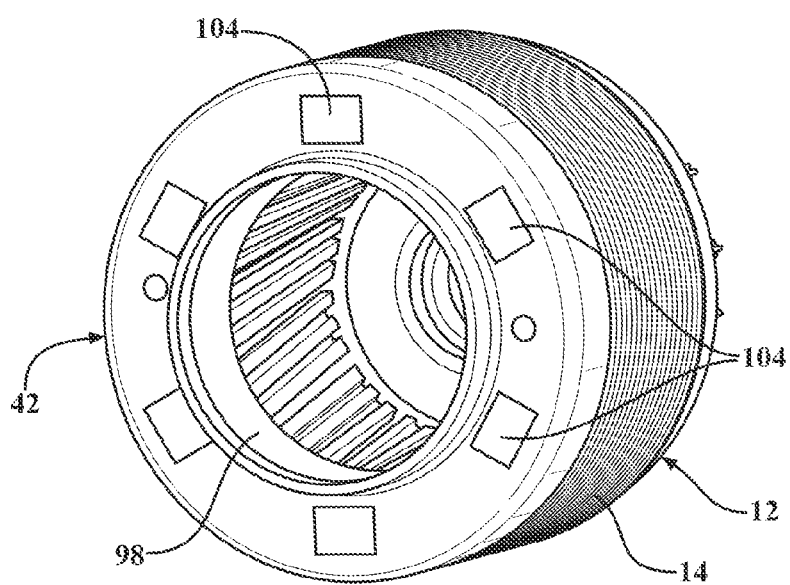
FIG. 12 is a perspective view of the stator assembly.

Referring to FIG. 10, the first diameter portion 124 of the end cap bore portion 118 defines a diameter that is substantially equal to the diameter of the second end cap bore 44, and the second end cap 42 is positioned over the mold tool horn 116 with the first diameter portion 124 extending through the second end cap bore 44. Hence, the overmold material will define an overmold rotor passage 25 (see FIG. 11) having a diameter substantially equal to the diameter of the second end cap bore 44 where it intersects the second end cap bore 44, which diameter may be greater than the diameter of the central rotor passage 22. That is, as seen in FIG. 11, the overmold rotor passage 25 defines a cylindrical inner diameter from a junction 43 of the overmold rotor passage 25 with the second end cap bore 44 to the second end 20 of the stator stack 14 that is substantially equal to an inner diameter defined by the second end cap bore 44 at the junction 43.

The second end cap 42 cooperates with the second end 20 of the stator stack 14 and with the tapered bore portion 126 of the mold tool horn 116 to define an annular space 134 for receiving the overmold material 50. The central bore portion 120 of the mold tool horn 116 extends beyond the first end 16 of the stator stack 14, and the shutoff ring 65 is positioned over the outwardly extending end of the central bore portion 120. An inner diameter of the shutoff ring 65 is substantially equal to the outer diameter of the central bore portion 120 and with the central bore portion 120 functions to close off open ends of the grooves 132 defined between the adjacent flutes 130 at the first stator stack end 18. It may be noted that in a motor design in which the central rotor passage 22 does not include bifurcated inner edges defined by fluted inner surfaces of the stator poles 16, i.e., where the inner surfaces of the stator poles 16 are smooth surfaces, it may be possible to perform the overmold process without the shutoff ring 65.

The end bearing portion 122 of the mold horn tool 116 is formed with a diameter that is substantially equal to the inner diameter of the bearing insert 56. The bearing insert 56 is received on the end bearing portion 122, and an axial end of the main body portion 60 of the bearing insert 56 may be received against a locating shoulder 136 at an end face of the central bore portion 120.

As seen in FIG. 10, an end cap mold tool 138 is positioned over the first end 18 of the stator stack 14. The end cap mold tool 138 includes an outer ledge 140 that engages against a radially outer edge of the first end 18 of the stator stack 14 and which encloses a mold cavity area 142. A plurality of pins 144 extend from an interior mold surface 146 through the mold cavity area 142 to engage against the shutoff ring 65 and firmly position the shutoff ring 65 against the first stator stack end 18. The end cap mold tool 138 includes a cylindrical central plug portion 148 that extends into engagement with an end 150 of the end bearing portion 122. A difference in the diameter of the central plug portion 148 and the diameter of the end bearing portion 122 defines a shoulder mold area 152 for formation of the shoulder portion 64 (FIG. 1) of the first end cap 38.

As illustrated in FIG. 11, the mold material 50 may be injected into the cavities defined between the stator stack 14, the mold horn tool 116, the second end cap 42, and the end cap mold tool 138 to form the first end cap 38, and to form the second end portion 98 of the overmold material 50. The material of the second end portion 98 forms around the tabs 100, extends through the openings 102 and forms the tab opening portions 104 to retain the second end cap 42 affixed to the stator assembly 12. In addition, the overmold material 50 fills voids through the slots 26, extending radially inwardly to the radial inner diameter defined by the flutes 130 on circumferentially adjacent stator poles 16. It should be noted that the engagement of the shutoff ring 65 and the step 128 with the first and second ends 18, 20, respectively, of the stator stack 14 operates to prevent flow of the overmold material 50 to the circumferentially inner portions of the poles 16 defined by the grooves 132.

After the mold material 50 has cured, the mold tool horn 116 and the end cap mold tool 138 may be removed. As noted above, FIG. 2 illustrates the stator assembly 14 following the molding operation with the second end cap 42 shown separated or removed from the stator assembly 12 such that the molded configuration of the second portion 98 of the overmold material 50 may be seen. Further, it may be noted that FIG. 2 illustrates the bearing insert 56 and the shutoff ring 65 separate from the overmold material 50 forming the first end cap 38, and it may be understood from the above description of the molding operation that in the construction of the stator assembly 14 these components are molded into the first end cap 38.

After the mold tool horn 116 and the end cap mold tool 138 have been removed, the rotor assembly 28 may be positioned within the central rotor passage 22 with the first end bearing 40 positioned within the bearing insert 56 in engagement against the shoulder portion 64. The endbell 46 may be positioned within the second end cap bore 44 with the second end bearing 48 located within the aperture 95 and located against the wave spring 94. Further, the endbell 46 may be positioned axially toward the second end 20 of the stator stack 14 to a location where a predetermined force is applied against the first and second end bearings 40, 48. Providing an axially adjustable location for the endbell 46 further permits adjustment for varying stack up tolerances in the axial direction, in that the axial position of the second end cap 42 relative to the location of the first end bearing 40 may vary with manufacturing variations within the specified tolerances of the components forming the stator assembly 12 and the rotor assembly 28.

Figure 13:
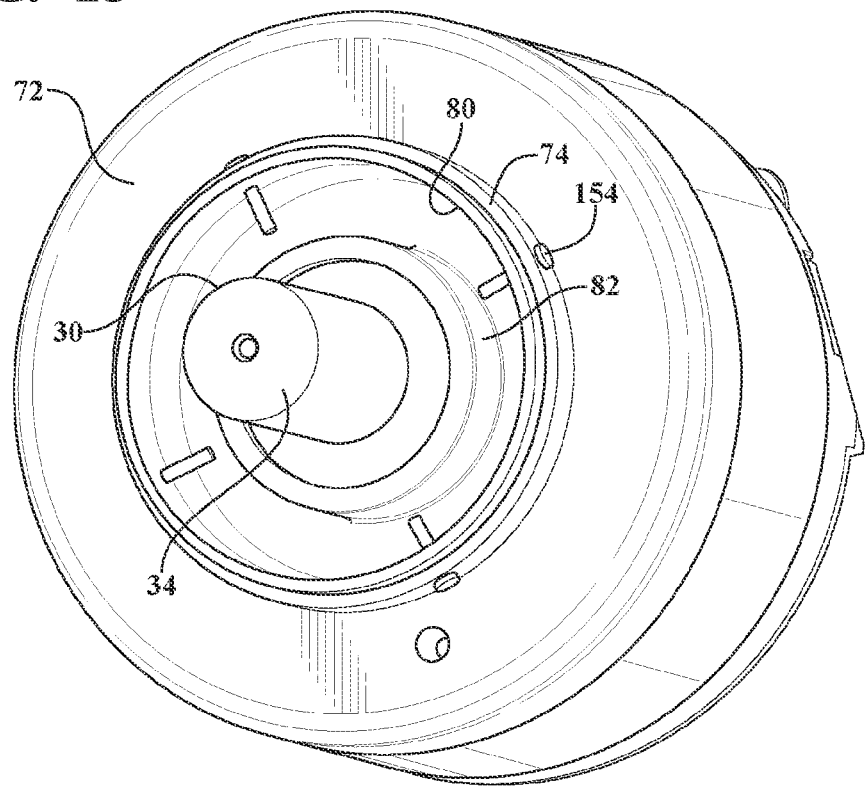
FIG. 13 is perspective view illustrating an attachment of an endbell to the second end cap.

The endbell 46 may be affixed in its axial position by means comprising any of a variety of mechanisms permitting axial positioning of the endbell 46 relative to the second end cap 42. For example, the endbell 46 may be affixed by a friction or press fit between an inner surface 75 (FIG. 2) of the second axially extending end cap leg 74 of the second end cap 42 and an outer surface 81 (FIG. 2) of the first leg 80 of the endbell 46. Alternatively, or in addition to a friction or press fit, the endbell 46 may be affixed to the second end cap 42 by fasteners, such as pins 154, extending through the second axially extending end cap leg 74 and the first endbell leg 80, as seen in FIG. 13. In alternative configurations for affixing the endbell 46 to the second end cap 42, portions of the second axially extending end cap leg 74 and the first endbell leg 80 may be mechanically deformed together, such as by pinching and/or bending adjacent surfaces together in a radial direction (not shown). Also, the endbell 46 and second end cap 42 may be affixed together by welding, soldering, adhesive bonding or any other attachment mechanism permitting selective axial positioning of the endbell 46 relative to the second end cap 42.

Figure 14:
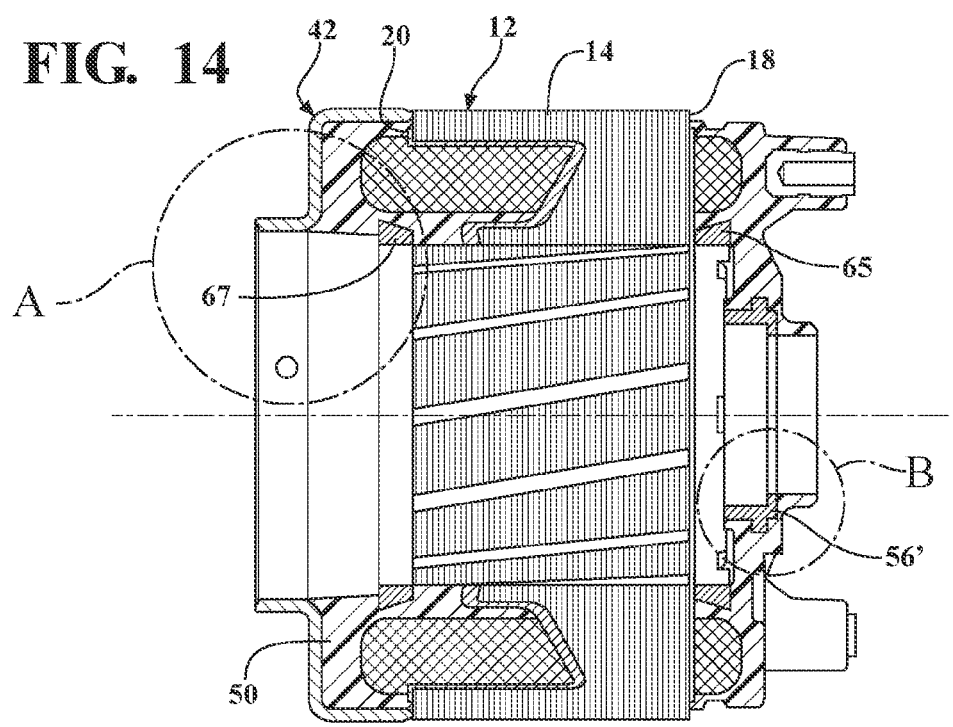
FIG. 14 is a cross-sectional view illustrating alternative aspects of the invention.
Figure 15:
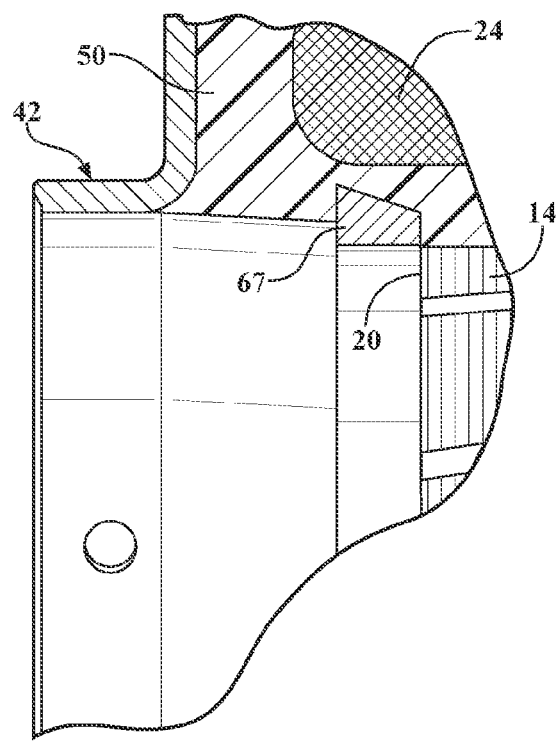
FIG. 15 is a detail view of an area A in FIG. 14.
Figure 16:
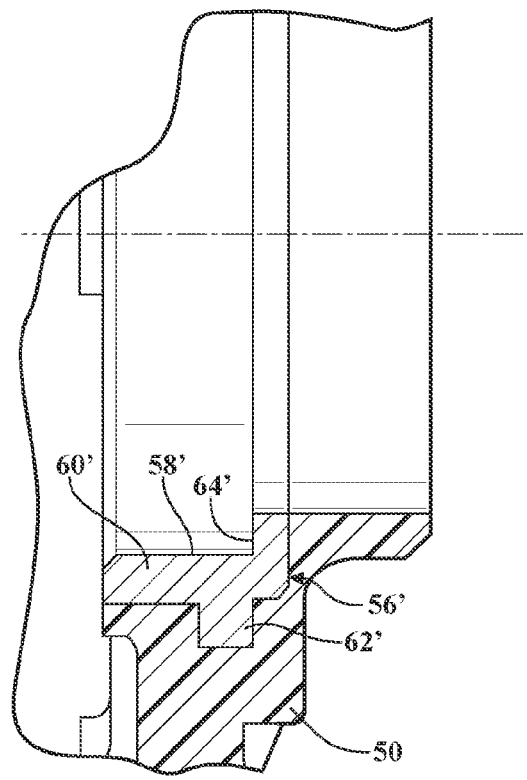
FIG. 16 is a detail view of an area B in FIG. 14.

Referring to FIGS. 14-16, alternative aspects of the invention are illustrated. As seen in FIGS. 14 and 15, the stator assembly 12 may include a second shutoff ring 67 positioned against the second end 20 of the stator stack 14 adjacent to the inner ends of the poles 16. The second shutoff ring 67 may have an inner diameter substantially equal to the outer diameter of the central bore portion 120 of the mold tool horn 116. The second shutoff ring 67 may function in a manner similar to the shutoff ring 65 to prevent the overmold material 50 from flowing into open ends of the grooves 132 defined between the adjacent flutes 130 at the second end 20 of the stator stack 14. The mold horn tool 116 may be provided with structure (not shown) for engaging against an outer end of the second shutoff ring 67 opposite from the second end 20 of the stator stack 14 to press the second shutoff ring 67 against the second end 20 of the stator stack 14 during the overmold process. The second shutoff ring 67 may perform the function of the step 128 on the mold tool horn 116, in which case the step 128 on the mold tool horn 116 may be modified to engage the outer end of the second shutoff ring 67 to hold the second shutoff ring 67 engaged on the second end 20 of the stator stack 14. For example, the step 128 may be formed at a location displaced from the second end 20 of the stator stack 14 a distance approximately equal to the height of the second shutoff ring 67. Further, the second shutoff ring 67 may comprise a resin or plastic material that may be the same as the resin material of the overmold material 50, providing semi-compressible material between the mold horn tool 116 and the second end 20 of the stator stack 14, and may prevent damage to an epoxy coating that is applied over the stator stack 14.

It should be noted that the second shutoff ring 67 may be provided to the second end 20 of the stator stack 14 in a construction of the stator stack 14 that does not include grooves 132 defined between adjacent flutes 130, i.e., in a construction where the interior surfaces of the stator poles 16 are substantially smooth. In particular, it may be desirable to provide a ring member having a semi-compressible characteristic, such as the shutoff ring 67, located adjacent to and surrounding the central rotor passage 22, to protect the second end 20 of the stator stack 14 from contract with the mold tool horn 116 which may result in damage to an epoxy coating on the stator stack 14, as discussed above.

As seen in FIGS. 14 and 16, an alternative bearing insert 56' is illustrated, where elements of the bearing insert 56' corresponding to the bearing insert 56 are labeled with the same reference numeral primed. The bearing insert 56' includes a shoulder portion 64' formed integrally with the main body portion 60' and extending radially inwardly from the inner surface 58'. The shoulder portion 64' of the bearing insert may define a reference surface for engaging and axially locating the first end bearing 40. The bearing insert 56' may be molded into the overmold material 50 in a manner similar to that described for the bearing insert 56.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An electric motor assembly comprising:
    a stator assembly comprising:
        a stator stack including a plurality of radially extending stator poles extending between first and second ends of said stator stack and defining a central rotor passage through the electric motor assembly; and
        a plurality of windings extending through stator slots defined between said stator poles;
    a rotor assembly comprising:
        a rotor shaft having opposing first and second ends; and
        a central portion supported on said rotor shaft and extending through said central rotor passage;
    a first end cap located adjacent to said first end of said stator stack and supporting a first end bearing for receiving said first end of said rotor shaft;
    a second end cap located adjacent to said second end of said stator stack and defining a second end cap bore concentrically aligned with said central rotor passage in an axial direction, and said second end cap including a first axially extending leg defining an annular space within said second end cap between said first axially extending leg and said second end cap bore;
    an overmold material extending through said stator slots and extending within and substantially filling said annular space within said second end cap; and
    an endbell formed separately from said second end cap and at least a portion of said endbell axially slidably positioned within said second end cap bore, a second end bearing located within said endbell for receiving said second end of said rotor shaft, wherein said endbell is slidably adjustable within said second end cap bore during positioning of said endbell into said second end cap thereby providing an adjustable final axial position for the endbell relative to said second end cap to compensate for variations in the axial position of said second end bearing relative to at least one of said stator assembly and said rotor assembly.

2. The electric motor assembly of claim 1, wherein said overmold material forms said first end cap.

3. The electric motor assembly of claim 1, wherein said second end cap includes a retention structure extending from said second end cap and engaged within said overmold material for effecting a retention of said second end cap to said stator assembly.

4. The electric motor assembly of claim 1, including an overmold rotor passage defined through said overmold material in said second end cap, said overmold rotor passage comprising a cylindrical passage concentrically aligned with said central rotor passage.

5. The electric motor assembly of claim 4, wherein said overmold rotor passage defines a cylindrical inner diameter from a junction of said overmold rotor passage with said second end cap bore to said second end of said stator stack that is substantially equal to an inner diameter defined by said second end cap bore at said junction of said overmold rotor passage with said second end cap bore.

6. The electric motor assembly of claim 5, wherein said inner diameters of said overmold rotor passage and said second end cap bore define a rotor insertion passage having a diameter greater than an outermost diameter of said rotor assembly.

7. The electric motor assembly of claim 2, including a generally cylindrical bearing insert molded into said first end cap said bearing insert defining an inner diameter for receiving and supporting said first end bearing within said first end cap.

8. The electric motor assembly of claim 7, including a shoulder portion formed in said overmold material of said first end cap and extending radially inwardly from said inner radius of said bearing insert, said shoulder portion comprising a reference surface for engaging said first end bearing, and said reference surface defining an axial position of said first end bearing.

9. The electric motor assembly of claim 7, wherein said bearing insert includes a shoulder portion extending inwardly from said inner diameter of said bearing insert, said shoulder portion comprising a reference surface for engaging and defining an axial position of said first end bearing.

10. The electric motor assembly of claim 2, wherein a radially inner surface of said poles comprise grooves extending longitudinally between said first and second ends of said stator stack and said first end cap including a shutoff ring engaged against said first end of said stator stack, said shutoff ring being located over ends of said grooves to prevent said overmold material from flowing into said grooves.

11. The electric motor assembly of claim 1, wherein said endbell includes a central aperture defining an endbell inner diameter, and including a flange portion extending radially inwardly from said endbell inner diameter, said second end bearing being supported within said endbell inner diameter and including a spring member located between said flange portion and said second end bearing for resiliently biasing said second end bearing toward said stator stack.

12. The electric motor assembly of claim 1, including a fastening structure extending radially between a radially inner surface of said second end cap bore and a radially outer surface of said endbell, the fastening structure fixing the axial position of said endbell relative to said second end cap after said endbell is positioned axially into said second end cap at said final axial position.

13. The electric motor assembly of claim 1, including a radially extending flange portion on said endbell, and including a spring located between said flange portion of said endbell and said second end bearing,
wherein said positioning of said endbell establishes a selected preload spring force against said second end bearing.

14. An assembly for an electric motor comprising:
a stator stack including a plurality of radially extending stator poles extending between first and second ends of said stator stack and defining a central rotor passage through the assembly;
a plurality of windings extending through stator slots defined between said stator poles;
a first end cap located adjacent to said first end of said stator stack;
a second end cap including:
first and second axially extending end cap legs, said first axially extending end cap leg having a first end located adjacent to said second end of said stator stack and a second end located distal from said stator stack;
an end portion extending radially inwardly from said second end of said first axially extending end cap leg;
said second axially extending end cap leg including a first end extending axially from said end portion in a direction away from said second end of said stator stack and a second end located distal from said end portion, said second axially extending end cap leg including an inner surface defining a cylindrical axially extending second end cap bore defining a second end cap bore diameter and being concentrically aligned with said central rotor passage in an axial direction;
an overmold material extending through said stator stack and extending within and substantially filling an annular space surrounded by said first axially extending end cap leg within said second end cap;
a cylindrical overmold rotor passage defined through said overmold material extending from a junction between said overmold rotor passage and said cylindrical second end cap bore to said second end of said stator stack, a diameter of said overmold rotor passage from said junction to said second end of said stator stack being substantially equal to said second end cap bore diameter at said junction; and
an endbell formed separately from said second end cap, said endbell including:
first and second axially extending legs, each of said first and second legs of said endbell including a first end proximate to said second end of said stator stack and a second end distal from said second end of said stator stack;
said first and second legs of said endbell being radially spaced from each other to define an annular gap therebetween;
a radially extending first flange portion connecting said first ends of said first and second legs; and
said first leg including an outer surface engaged with said inner surface of said second axially extending end cap leg.

15. The assembly of claim 14, wherein said overmold rotor passage receives at least a portion of said endbell therein.

16. The assembly of claim 14, wherein said endbell includes a radially extending second flange portion extending radially inwardly from said second end of said second leg.

17. The assembly of claim 16, including an end bearing supported in engagement with an inner surface of said second leg of said endbell, between said first and second ends of second leg.

18. The assembly of claim 17, including a spring located between said second flange portion of said endbell and said end bearing, said spring providing a biasing force against said end bearing in the axial direction.

19. The assembly of claim 14, including tabs extending axially from said end portion toward said stator stack and engaged within said overmold material for effecting a retention of said second end cap to said stator assembly.

20. The electric motor assembly of claim 14, including means coupling said endbell to said second cap for retaining said endbell at a predetermined axial location relative to said second end cap.

21. The electric motor assembly of claim 14, including at least one opening defined through said second end cap and said overmold material extending through said at least one opening for effecting a retention of said second end cap to said stator assembly.

22. The electric motor assembly of claim 21, including tabs extending from said second end cap toward said stator stack and engaged within said overmold material for further effecting a retention of said second end cap to said stator assembly, said at least one opening comprising openings in said second end cap adjacent to each of said tabs.

23. The assembly of claim 14, wherein said overmold material forms said first end cap, and including a generally cylindrical bearing insert molded into said first end cap, said bearing insert defining an inner diameter for receiving and supporting an end bearing within said first end cap.

24. The electric motor assembly of claim 23, including a shoulder portion located adjacent to and extending radially inwardly from said inner radius of said bearing insert, said shoulder portion comprising a reference surface for engaging and defining an axial position of said end bearing within said first end cap.

25. An electric motor assembly comprising:
- a stator assembly comprising:
    - a stator stack including a plurality of radially extending stator poles extending between first and second ends of said stator stack and defining a central rotor passage through the electric motor assembly; and
    - a plurality of windings extending through stator slots defined between said stator poles;
- a rotor assembly comprising:
    - a rotor shaft having opposing first and second ends; and
    - a central portion supported on said rotor shaft and extending through said central rotor passage;
- a first end cap formed of an overmold material located adjacent to said first end of said stator stack;
- a generally cylindrical bearing insert molded into said overmold material forming said first end cap, said bearing insert defining an inner diameter for receiving and supporting a first end bearing within said first end cap for receiving said first end of said rotor shaft;
- a shoulder portion formed in said overmold material of said first end cap and extending radially inwardly from said inner diameter of said bearing insert, said shoulder portion comprising a reference surface for engaging said first end bearing, and said reference surface defining an axial position of said first end bearing;
- a second end cap located adjacent to said second end of said stator stack and defining a second end cap bore concentrically aligned with said central rotor passage in an axial direction; and
- an endbell formed separately from said second end cap and at least a portion of said endbell positioned within said second end cap bore, said endbell supporting a bearing for receiving said second end of said rotor shaft.

26. An electric motor assembly comprising:
- a stator assembly comprising:
    - a stator stack including a plurality of radially extending stator poles extending between first and second ends of said stator stack and defining a central rotor passage through the electric motor assembly; and
    - a plurality of windings extending through stator slots defined between said stator poles;
- a rotor assembly comprising:
    - a rotor shaft having opposing first and second ends; and
    - a central portion supported on said rotor shaft and extending through said central rotor passage;
- a first end cap formed of an overmold material located adjacent to said first end of said stator stack and supporting a first end bearing for receiving said first end of said rotor shaft;
- a second end cap located adjacent to said second end of said stator stack and defining a second end cap bore concentrically aligned with said central rotor passage in an axial direction;
- an endbell formed separately from said second end cap and at least a portion of said endbell positioned within said second end cap bore, said endbell supporting a bearing for receiving said second end of said rotor shaft; and
- wherein a radially inner surface of said poles comprise grooves extending longitudinally between said first and second ends of said stator stack, and said first end cap including a shutoff ring engaged against said first end of said stator stack, said shutoff ring being located over ends of said grooves to prevent said overmold material from flowing into said grooves.

27. The electric motor assembly of claim 26, including a second shutoff ring engaged against said second end of said stator stack, said shutoff ring being located over ends of said grooves in said poles to prevent said overmold material from flowing into said grooves.

28. The electric motor assembly of claim 26, including a ring member engaged against said second end of said stator stack, said ring member comprising a resin material and being located adjacent to and surrounding said central rotor passage.

\* \* \* \* \*